(12) United States Patent
Cho (10) Patent No.: US 9,236,200 B2
(45) Date of Patent: Jan. 12, 2016

(54) TOUCH WINDOW AND MANUFACTURING METHOD THEREOF

(71) Applicant: LG INNOTEK CO., LTD., Seoul (KR)

(72) Inventor: Sung Jung Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 295 days.

(21) Appl. No.: 13/906,896

(22) Filed: May 31, 2013

(65) Prior Publication Data

US 2013/0319835 A1    Dec. 5, 2013

(30) Foreign Application Priority Data

May 31, 2012    (KR) .......................... 10-2012-0058540

(51) Int. Cl.
*G06F 3/041* (2006.01)
*H01H 1/64* (2006.01)
(52) U.S. Cl.
CPC ................. *H01H 1/64* (2013.01); *G06F 3/041* (2013.01); *G06F 2203/04103* (2013.01)
(58) Field of Classification Search
CPC ............... G06F 3/041; G06F 3/044; G06F 2203/04102; G06F 2203/04103

USPC ................... 345/173–178; 178/18.01–18.09, 178/20.01–20.04

See application file for complete search history.

(56) References Cited

U.S. PATENT DOCUMENTS

| | | | |
|---|---|---|---|
| 8,467,834 B2* | 6/2013 | Lee et al. ....................... | 455/566 |
| 2010/0075720 A1* | 3/2010 | Lee et al. ....................... | 455/566 |
| 2012/0075233 A1* | 3/2012 | Lakshminarayanan et al. ............................. | 345/174 |

* cited by examiner

*Primary Examiner* — Vijay Shankar
(74) *Attorney, Agent, or Firm* — Saliwanchik, Lloyd & Eisenschenk (57) ABSTRACT

Disclosed is a touch window. The touch window includes a cover window including an active area and an unactive area; a sensing electrode part on the active area; a wiring electrode part formed on the unactive area and connected to the sensing electrode part; an insulation film on one end of the wiring electrode part; a flexible printed circuit board spaced apart from the insulation film and formed on an opposite end of the wiring electrode part; and a protective layer on the wiring electrode part placed on a space region between the insulation film and the flexible printed circuit board.

18 Claims, 9 Drawing Sheets

TOUCH WINDOW AND MANUFACTURING METHOD THEREOF

CROSS-REFERENCE TO RELATED APPLICATION

This application claims the benefit under 35 U.S.C. §119 of Korean Patent Application No. 10-2012-0058540, filed May, 31, 2012, which is hereby incorporated by reference in its entirety.

BACKGROUND

A touch window is installed on a display surface of an image display device such as a cathode ray tube (CRT), a liquid crystal display (LCD), a field emission display (FED), a plasma display panel (PDP), and an electro-luminescence device (ELD), so that a user inputs predetermined information into an electronic appliance by pressing the touch panel while viewing the image display device.

Figure 1:
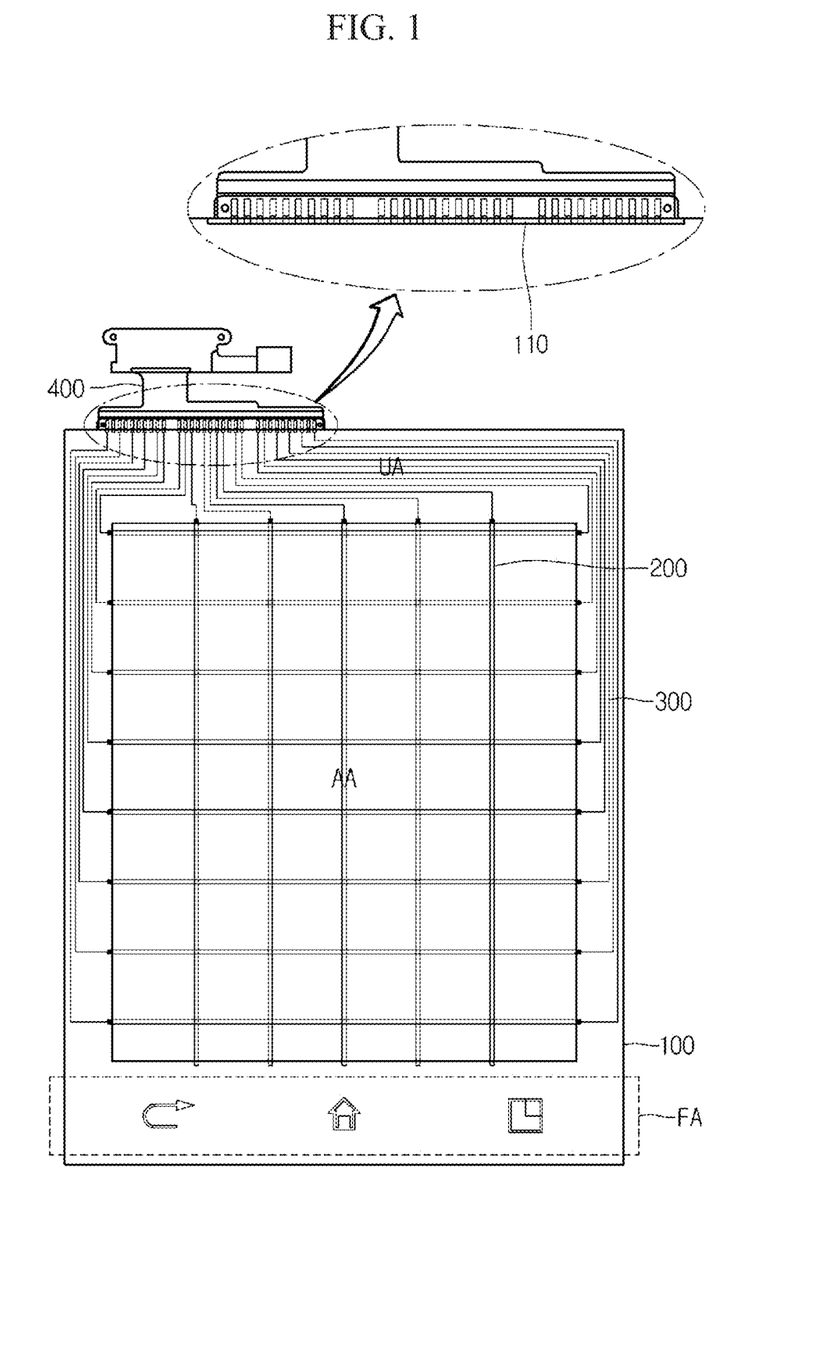
FIG. 1 is a view showing a touch window according to the related art.

FIG. 1 is a view showing a touch window according to the related art.

Referring to FIG. 1, the touch window includes a cover window 100 which receives a touch input from an outside, a TSP (Touch Screen Panel) including an AA (Active Area) for receiving the touch input through a sensing electrode and an UA (Unactive Area) for non-receiving the touch input which are implemented by forming an electrode pattern on a lower portion of the cover window, and an F/A (Function Area) of the cover window 100, which includes an instruction icon and is electrically connected to the TSP.

The wiring electrode part 300, which is formed corresponding to the sensing electrode part 200 in the AA, and a pad area, which transfers a touch sensing signal from the wiring electrode part 300 to a driving chip, are formed in the UA. Thus, the touch window is coupled through the pad area to an FPCB (Flexible Printed Circuit Board) 400 in which the driving chip is installed.

Referring to the enlarged view of a bonding area depicted in FIG. 1, according to the related art, after processing the pad area and the FPCB 400, respectively, an ACF (Anisotropic Conductive Film) bonding process is required for coupling the pad area and the FPCB 400 to each other. However, an empty space 110 may be formed at a portion adhesive to the FPCB 400. If the empty space 110 is formed, a foreign material may be introduced into the empty space 110 or corrosion may be caused, so that the touch window may be out of order.

BRIEF SUMMARY

According to the embodiment, there is provided a touch window including a cover window including an active area and an unactive area; a sensing electrode part on the active area; a wiring electrode part formed on the unactive area and connected to the sensing electrode part; an insulation film on one end of the wiring electrode part; a flexible printed circuit board spaced apart from the insulation film and formed on an opposite end of the wiring electrode part; and a protective layer on the wiring electrode part placed on a space region between the insulation film and the flexible printed circuit board.

Further, according to the embodiment, there is provided a touch window including a cover window including an active area and an unactive area; a sensing electrode part on the active area; a wiring electrode part formed on the unactive area and connected to the sensing electrode part; a pad part on one end of the wiring electrode part; an insulation film on one end of the pad part; a flexible printed circuit board spaced apart from the insulation film and formed on an opposite end of the pad part; and a protective layer on the pad part placed on a space region between the insulation film and the flexible printed circuit board.

The touch window according to the embodiment includes the protective layer formed on an area of the wiring electrode part or the pad part exposed through the space region between the insulation film and the flexible printed circuit board.

Thus, the protective layer including an insulation material, which is capable of protecting the wiring electrode part or the pad part, is coated on the space region to form the insulation layer, so that the insulation layer can protect the wiring electrode part or the pad part.

Therefore, according to the touch window of the embodiment, the wiring electrode part or the pad part, which may be exposed to an outside through the space region, may be protected from oxidation or corrosion, so that the reliability of the touch window may be improved.

DETAILED DESCRIPTION

Hereinafter, the structure and the operation according to the embodiment will be described in detail with reference to accompanying drawings. In the following description based on the accompanying drawings, the same elements will be assigned with the same reference numerals regardless of drawing numbers, and the repetition in the description of the same elements having the same reference numerals will be omitted in order to avoid redundancy. Although the terms "first" and "second" may be used in the description of various elements, the embodiment is not limited thereto. The terms "first" and "second" are used to distinguish one element from the other elements.

Hereinafter, a touch window according to an embodiment will be described in detail with reference to FIGS. 2 to 6.

Figure 2:
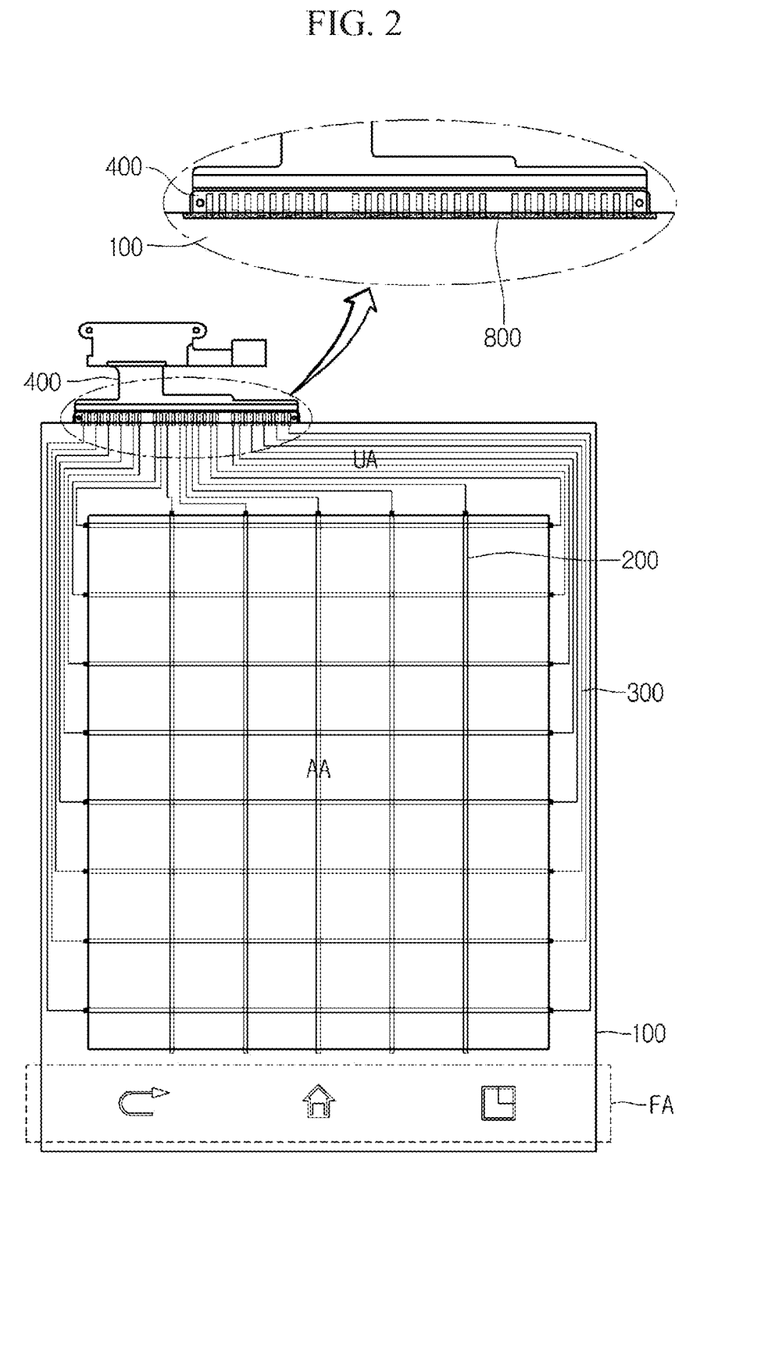
FIG. 2 is a plan view showing the top surface of a touch window according to an embodiment.

FIG. 2 is a plan view showing the top surface of a touch window according to an embodiment. FIGS. 3 to 6 views showing a bonding part of a PCB of the touch window according to an embodiment.

Referring to FIG. 2, the touch window according to the embodiment includes a cover window 100 including an AA (Active Area) and an UA (Unactive Area), an instruction icon pattern part 500, a sensing electrode part formed on the AA, a wiring electrode part 300 formed on the UA, a PCB 400, that is, a FPCB (Flexible Printed Circuit Board) connected to the wiring electrode part.

The cover window 100 may include glass or plastic. For example, the cover window 100 may include strengthened glass, half-strengthened glass, sodalime glass or strengthened plastic.

The cover window 100 may include the AA and the UA. The AA refers to an area through which a touch instruction may be input by a user. To the contrary to the AA, the UA signifies an area to which the touch instruction is not input because the UA is not activated even if the touch of the user is input thereto.

The sensing electrode part 200 is formed on the AA. The sensing electrode part 200 includes a first sensing electrode pattern formed in a longitudinal direction and a second sensing electrode pattern formed in a horizontal direction. The sensing electrode part 200 is densely formed on a top surface of the AA of the cover window 100.

The sensing electrode part 200 may include at least one selected from the group consisting of indium tin oxide, indium zinc oxide, copper oxide, carbon nano tube, CNT and Ag nano wire.

The wiring electrode part 300 is formed on the UA. The wiring electrode part 300 is electrically connected to the sensing electrode part 200. The wiring electrode part 300 may transfer a touch sensing signal from the sensing electrode part 200 to a driving chip mounted on a connector through the FPCB 400.

The wiring electrode part 300 may be directly or indirectly connected to the FPCB 400.

For example, the wiring electrode part 300 and the FPCB 400 may be connected to each other through a plurality of pad parts. The pad parts may be formed of a metallic material such as Ag.

That is, after first and second pad parts 600 and 700 are formed on the wiring electrode part 300 and the FPCB 400, respectively, the wiring electrode part 300 and the FPCB 400 may be connected to each other through an ACF (Anisotropic Conductive Film) process.

Further, the wiring electrode part 300 and the FPCB 400 may be connected to each other through an ACF (Anisotropic Conductive Film) process without any pad parts.

Further, an insulation film 500 may be formed on one end of the wiring electrode part 300. The insulation film 500 may extend from the sensing electrode part 200 such that the insulation film 500 may be formed on the one end of the wiring electrode part 300.

A touch window according to a first embodiment may be formed without any pad parts and a touch window according to a second embodiment may include pad part formed therein.

Figure 3:
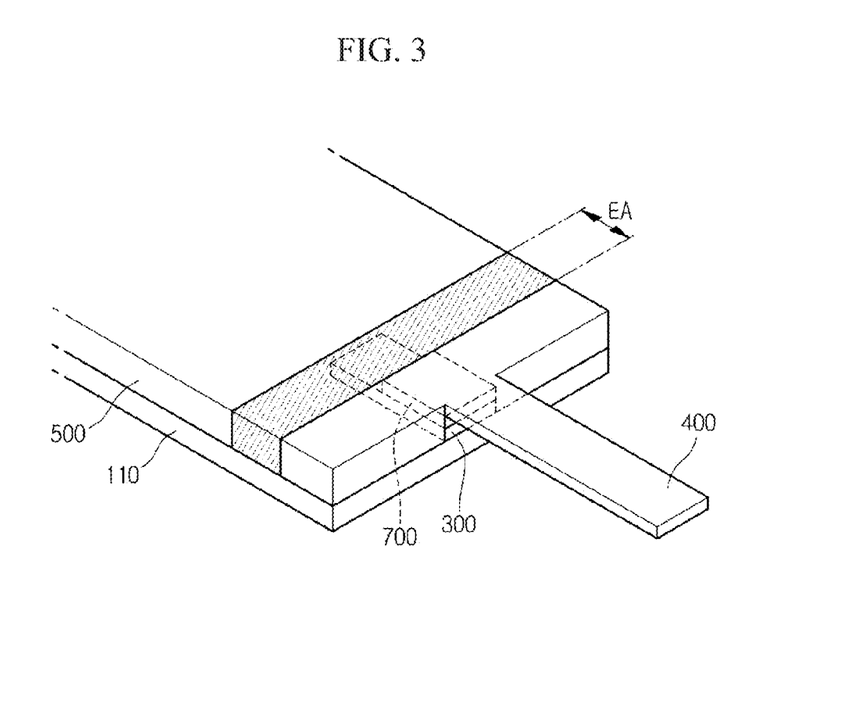
FIGS. 3 to 6 views showing a bonding part of a PCB of the touch window according to an embodiment.

Referring to FIGS. 2 and 3, the touch window according to the first embodiment includes a cover window 100 including an AA (Active Area) and an UA (Unactive Area), a sensing electrode part 200 formed on the AA, a wiring electrode part 300 connected to the sensing electrode part 200, an insulation film 500 formed on one end of the wiring electrode part 300, a FPCB (Flexible Printed Circuit Board) connected to the wiring electrode part spaced apart from the insulation film 500 and formed an opposite end of the wiring electrode part 300. In addition, a protective layer 800 is formed on the wiring electrode part 300 placed at a space region between the insulation film 500 and the FPCB 400.

The protective layer 800 may be formed on the wiring electrode part 300 exposed to an outside through the space region EA. In detail, the protective layer 800 may surround the wiring electrode part 300 exposed to an outside through the space region EA. In more detail, the protective layer 800 may make direct contact with the wiring electrode part 300 exposed to an outside through the space region EA.

The protective layer 800 may include an insulation material. In detail, the protective layer 800 may include at least one of PET (polyethylene terephthalate), PC (polycarbonate), PES (polyethersulfone), PI (polyimide) and PMMA (PolyMethylMethaAcrylate).

Thus, the protective layer 800 may protect the wiring electrode part 300 exposed to an outside through the space region EA from moisture, oxygen or an impact. Therefore, the protective layer 800 may protect the wiring electrode part 300 exposed to an outside through the space region EA from corrosion, oxidation and crack caused by external influence.

Figure 4:
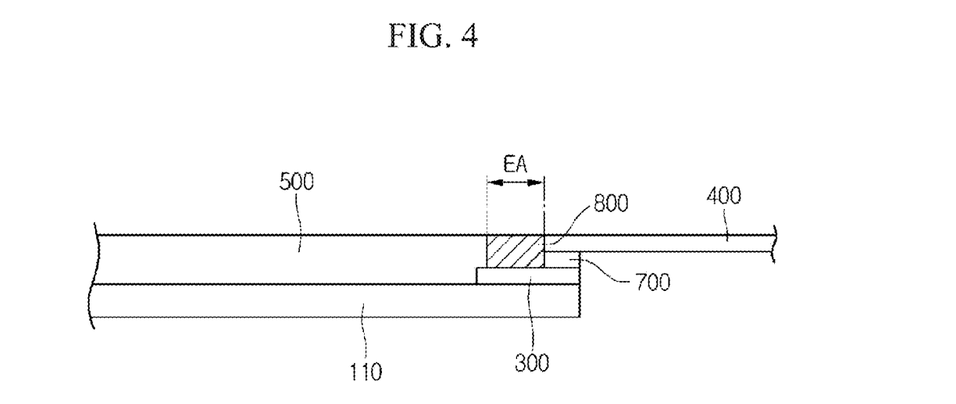
Figure 5:
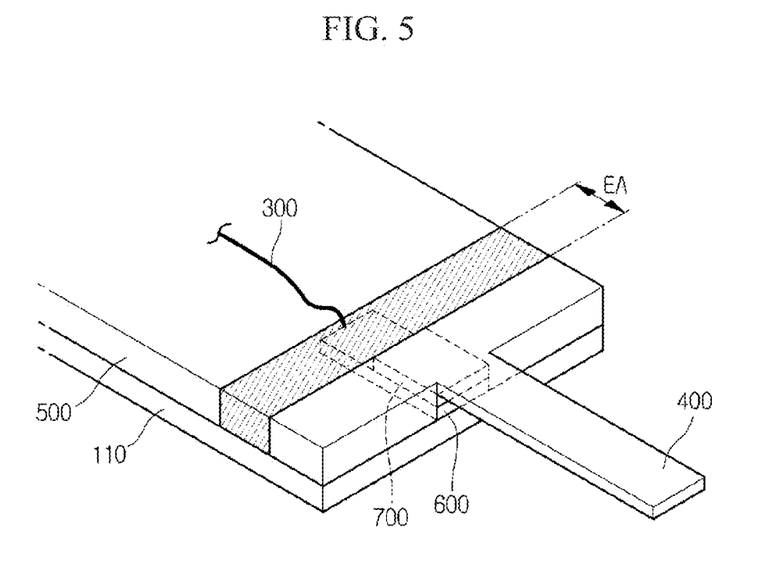
Figure 6:
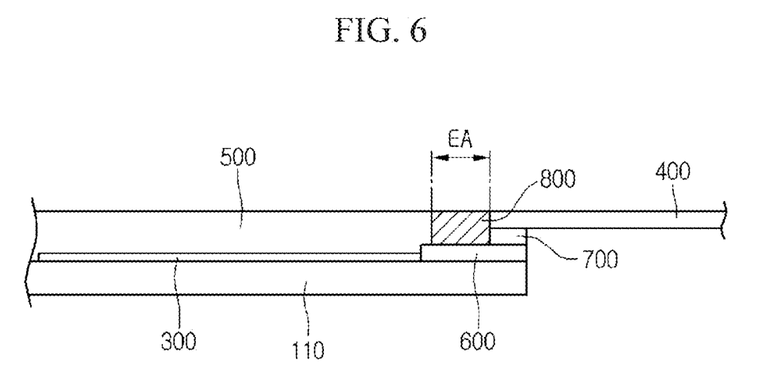

Referring to FIGS. 2 and 4, the touch window according to the second embodiment includes a cover window 100 including an AA (Active Area) and an UA (Unactive Area), a sensing electrode part 200 formed on the AA, a wiring electrode pad 300 connected to the sensing electrode part 200, a first pad part 600 formed on one end of the wiring electrode part 300, an insulation film 500 formed on one end of the first pad part 600, a FPCB (Flexible Printed Circuit Board) 400 spaced apart from the insulation film 500 and formed an opposite end of the first pad part 600. In addition, a protective layer 800 is formed on the first pad part 500 placed at a space region between the insulation film 500 and the FPCB 400.

The protective layer 800 may be formed on the first pad part 600 exposed to an outside through the space region EA. In detail, the protective layer 800 may surround the first pad part 600 exposed to an outside through the space region EA. In more detail, the protective layer 800 may make direct contact with the first pad part 600 exposed to an outside through the space region EA.

The protective layer 800 may include an insulation material. In detail, the protective layer 800 may include at least one of PET (polyethylene terephthalate), PC (polycarbonate), PES (polyethersulfone), PT (polyimide) and PMMA (PolyMethylMethaAcrylate).

Thus, the protective layer 800 may protect the first pad part 600 exposed to an outside through the space region EA from moisture, oxygen or an impact. Therefore, the protective layer 800 may protect the first pad part 600 exposed to an outside through the space region EA from corrosion, oxidation and crack caused by external influence.

According to the touch windows of the first and second embodiments, the wiring electrode part 300 or the first pad part 600 exposed to an outside through the space region EA may be protected from external influence.

According to the related art, the space region of the wiring electrode part or the pad part is exposed to an outside, so that the pad part formed of a metallic material may be oxidized with oxygen, corroded with moisture or cracked.

Thus, an insulation material which is capable of protecting the wiring electrode part or the pad part is coated on the space region of the wiring electrode part or the pad part, that is, the exposed region to form an insulation layer, so that the insulation layer performs the function of protecting the wiring electrode part or the pad part by a protective layer.

Therefore, according to the touch window of the embodiment, the wiring electrode part or the pad part, which may be exposed to an outside when connecting the FPCB to the wiring electrode part, may be protected from oxidation, corrosion, or crack, so that the reliability of the touch window may be improved.

Hereinafter, touch windows having various structures according to various embodiments will be described with reference to FIGS. 7 to 14. FIGS. 7 to 14 are views showing a bonding part of a wiring electrode part and a FPCB in order to illustrate various embodiments of the touch window according to positions at which first and second sensing electrode patterns are formed. Further, the embodiments may be applied to the first and second embodiments.

Figure 7:
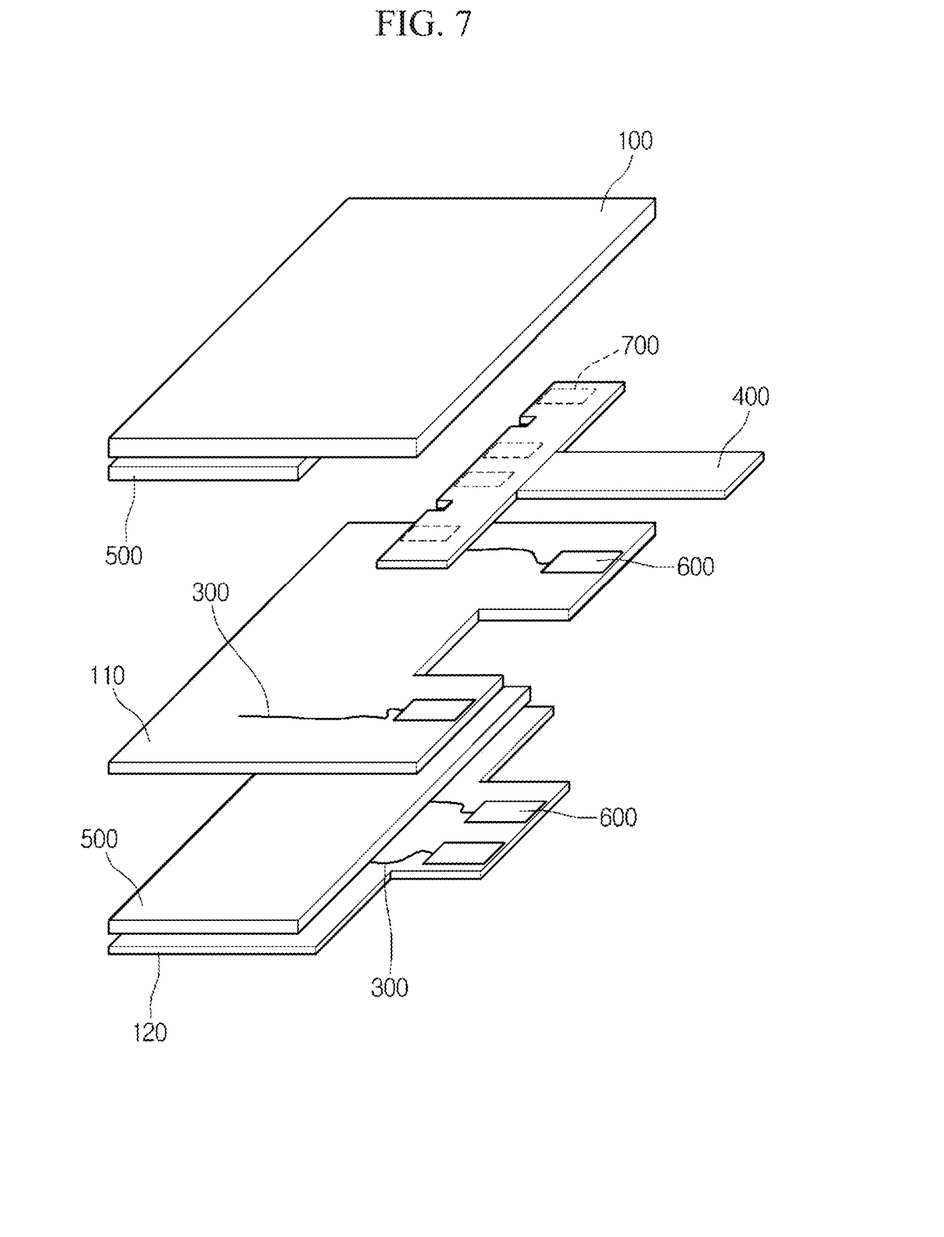
FIGS. 7 to 14 are views showing a bonding part of a wiring electrode part and a FPCB in order to illustrate various embodiments of the touch window according to positions at which first and second sensing electrode patterns are formed.
Figure 8:
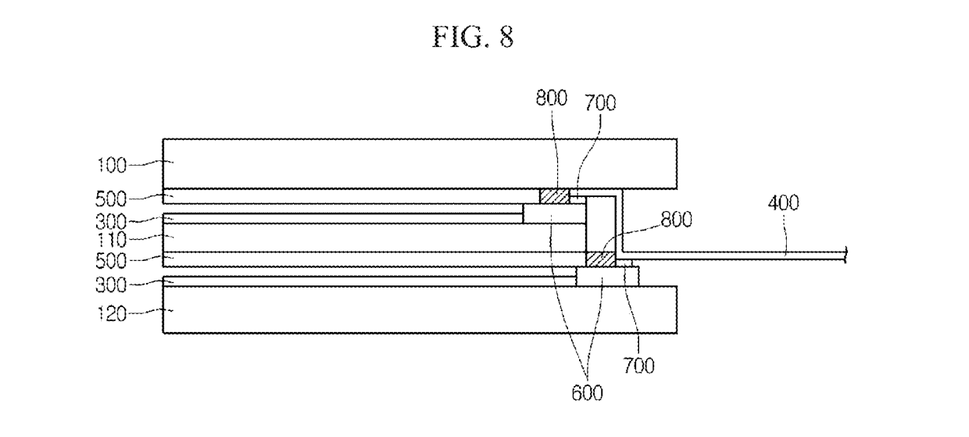

Referring to FIGS. 7 and 8, according to the touch window of the embodiment, a first sensing electrode part (not shown) may be formed on one surface of a first substrate 110 disposed on a cover window 100. A second sensing electrode part (not shown) may be formed on a second substrate 120 disposed on the first substrate 110.

A wiring electrode part 300 is formed on a UA (Unactive Area) of the first and second substrates 110 and 120. A first pad part 600 for connecting a FPCB 400 to the wiring electrode part 300 is formed on the first and second substrates 110 and 120. The first pad part 600 may be adhesive to the second pad part 700 formed on the FPCB 400 through an ACF bonding. As described above, the wiring electrode part 300 may be directly connected to the FPCB 400 without any pad parts.

Further, an insulation film 500 may be disposed between the cover window 100 and the first substrate 110 and between the first and second substrates 110 and 120. The insulation film 500 may protect sensing electrodes formed on an AA (Active Area) of the first and second substrate 110 and 120. The insulation film 500 may be formed to make contact with one end of the wiring electrode part 300 or one end of the first pad part 600.

Further, the FPCB 400 is spaced apart from the insulation film 500 to form a space region. The FPCB 400 may be formed to make contact with the opposite end of the wiring electrode part 300 or the opposite end of the first pad part 600. That is, the second pad part 700 may be formed to make contact with the opposite end of the wiring electrode part 300 or the opposite end of the first pad part 600.

A protective layer 800 is formed by coating an insulation material on the space region. In detail, the protective layer 800 may be formed while making direct contact with the wiring electrode part or the first pad part or directly surrounding the wiring electrode part or the first pad part which is exposed to an outside through the space region.

Figure 9:
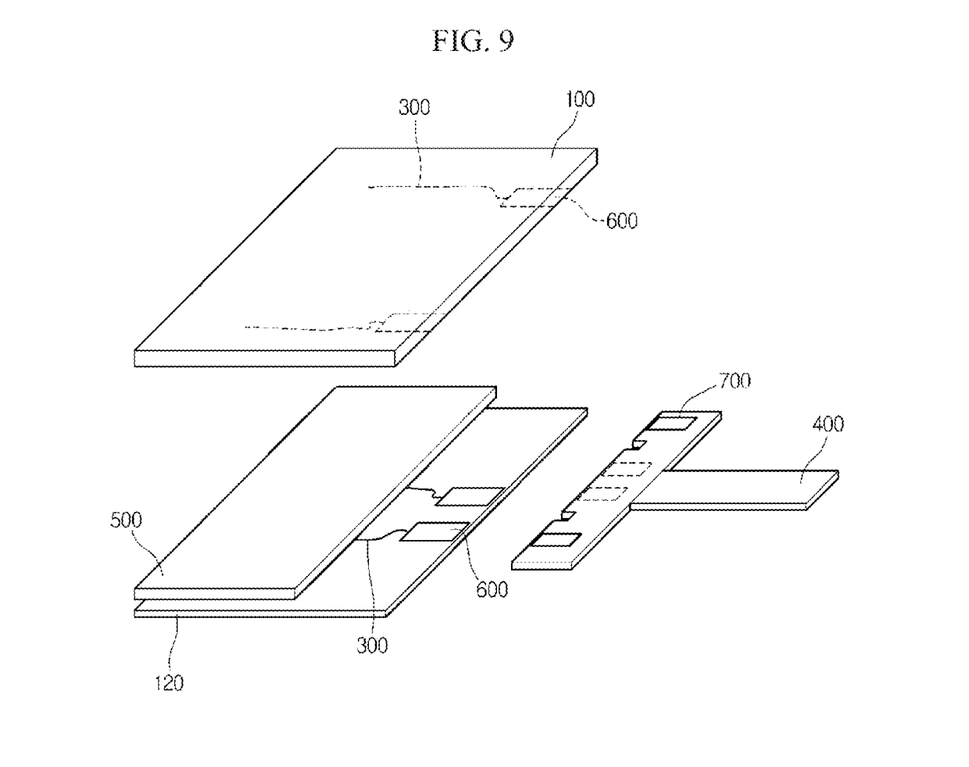
Figure 10:
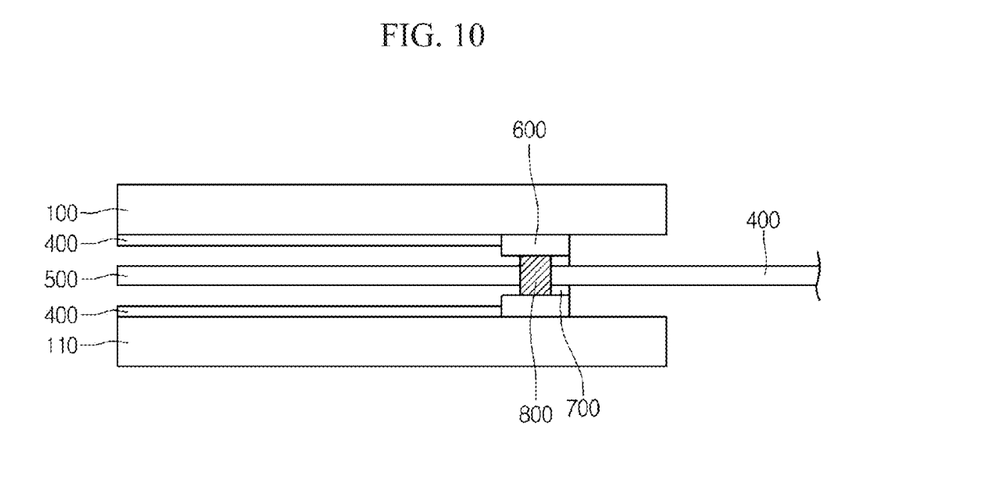

Referring to FIGS. 9 and 10, according to the touch window of the embodiment, a first sensing electrode part (not shown) may be formed on one surface of the cover window 100. A second sensing electrode part (not shown) may be formed on one surface of a substrate disposed on the cover window 100.

A wiring electrode part 300 is formed on a UA (Unactive Area) of the cover window 100 and a first substrate 110. A first pad part 600 for connecting a FPCB 400 to the wiring electrode part 300 is formed on the cover window 100 and the first substrate 110. The first pad part 600 may be adhesive to the second pad part 700 formed on the FPCB 400 through an ACF bonding. As described above, the wiring electrode part 300 may be directly connected to the FPCB 400 without any pad parts.

Further, an insulation film 500 may be disposed between the cover window 100 and the first substrate 110. The insulation film 500 may protect sensing electrodes formed on an AA (Active Area) of the cover window 100 and the first substrate 110. The insulation film 500 may be formed to make contact with one end of the wiring electrode part 300 or one end of the first pad part 600.

Further, the FPCB 400 is spaced apart from the insulation film 500 to form a space region. The FPCB 400 may be formed to make contact with the opposite end of the wiring electrode part 300 or the opposite end of the first pad part 600. That is, the second pad part 700 may be formed to make contact with the opposite end of the wiring electrode part 300 or the opposite end of the first pad part 600.

A protective layer 800 is formed by coating an insulation material on the space region. In detail, the protective layer 800 may be formed white making direct contact with the wiring electrode part or the first pad part or directly surrounding the wiring electrode part or the first pad part which is exposed to an outside through the space region.

Figure 11:
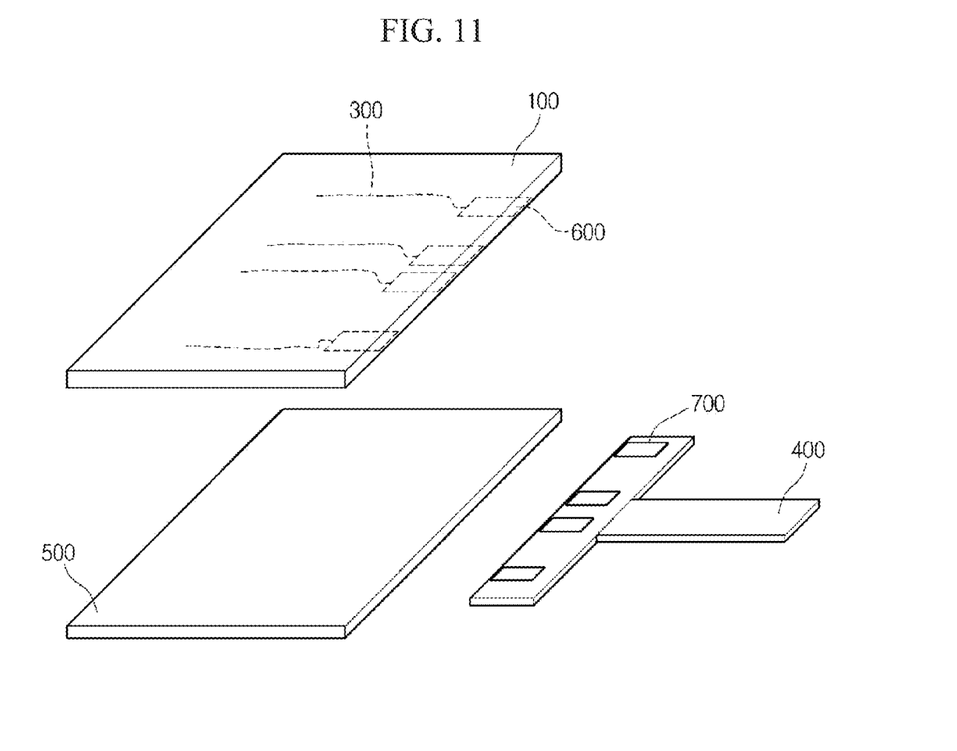
Figure 12:
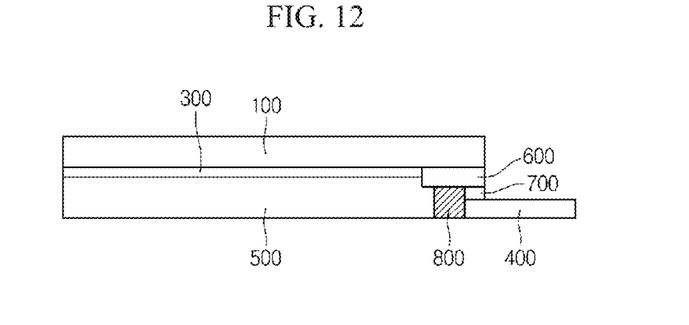

Referring to FIGS. 11 and 12, according to the touch window of the embodiment, first and second sensing electrode parts (not shown) may be formed on a cover window 100. That is, the first and second sensing electrode parts may be formed on one surface of the cover window 100.

A wiring electrode part 300 is formed on a UA (Unactive Area) of the cover window 100. A first pad part 600 for connecting a FPCB 400 to the wiring electrode part 300 is formed on the cover window 100. The first pad part 600 may be adhesive to the second pad part 700 formed on the FPCB 400 through an ACF bonding. As described above, the wiring electrode part 300 may be directly connected to the FPCB 400 without the first pad part 600.

Further, an insulation film 500 may be formed on a lower surface of the cover window 100, that is, one surface of the cover window 100 on which the sensing electrode part. The insulation film 500 may protect sensing electrodes formed on an AA (Active Area) of the cover window 100. The insulation film 500 may be formed to make contact with one end of the wiring electrode part 300 or one end of the first pad part 600.

Further, the FPCB 400 is spaced apart from the insulation film 500 to form a space region. The FPCB 400 may be formed to make contact with the opposite end of the wiring electrode part 300 or the opposite end of the first pad part 600. That is, the second pad part 700 may be formed to make contact with the opposite end of the wiring electrode part 300 or the opposite end of the first pad part 600.

A protective layer 800 is formed by coating an insulation material on the space region. In detail, the protective layer 800 may be formed while making direct contact with the wiring electrode part or the first pad part or directly surround the wiring electrode part or the first pad part which is exposed to an outside through the space region.

Figure 13:
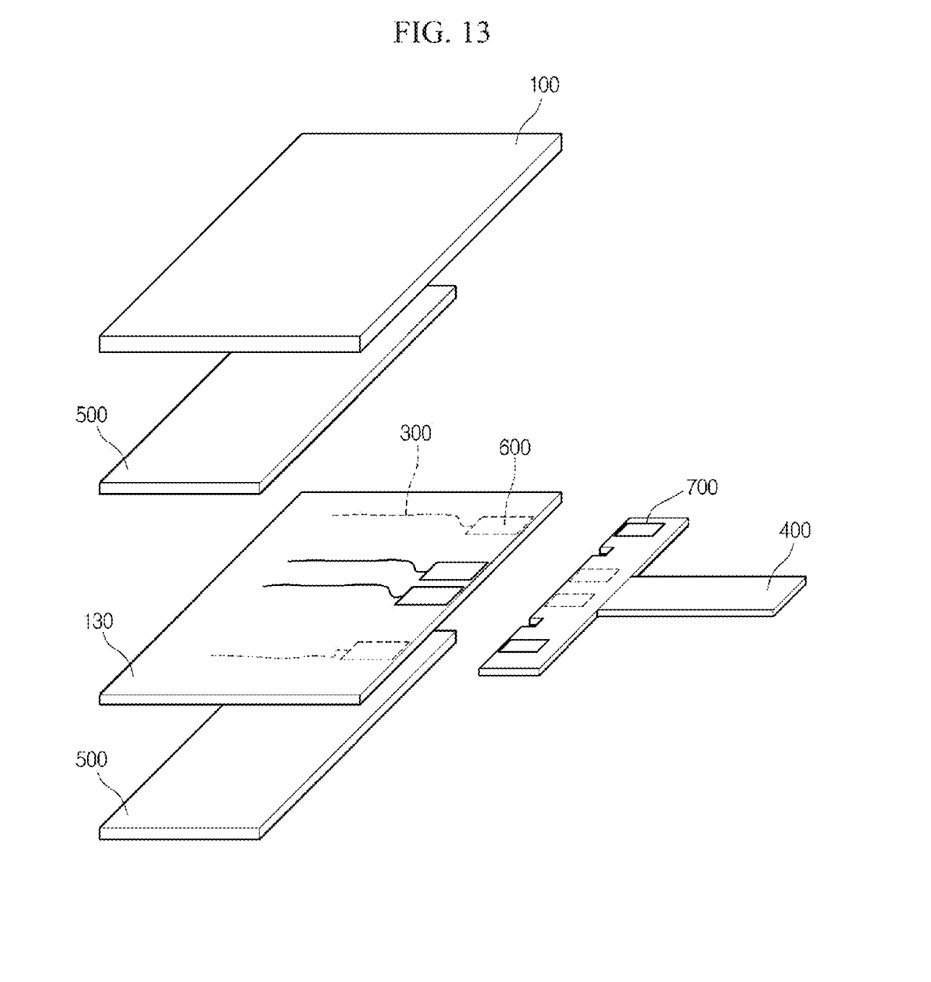
Figure 14:
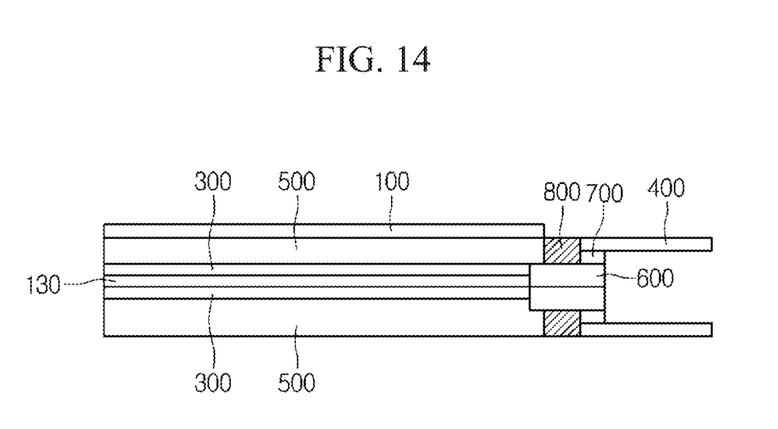

Referring to FIGS. 13 and 14, according to the touch window of the embodiment, first and second sensing electrode parts (not shown) may be formed on both surfaces of a substrate 130 disposed on a cover window 100. That is, the first and second sensing electrode parts may be formed on both surfaces of the substrate 130.

A wiring electrode part 300 is formed on a UA (Unactive Area) of the substrate 130. A first pad part 600 for connecting a FPCB 400 to the wiring electrode part 300 is formed on the substrate 130. The first pad part 600 may be adhesive to the second pad part 700 formed on the FPCB 400 through an ACF bonding. As described above, the wiring electrode part 300 may be directly connected to the FPCB 400 without the first pad part 600.

Further, an insulation film 500 may be disposed between the cover window 100 and the substrate 130 and on a lower surface of the substrate 130. The insulation film 500 may protect sensing electrodes formed on an AA (Active Area) of the substrate 130. The insulation film 500 may be formed to make contact with one end of the wiring electrode part 300 or one end of the first pad part 600.

Further, the FPCB 400 is spaced apart from the insulation film 500 to form a space Region. The FPCB 400 may be formed to make contact with the opposite end of the wiring electrode part 300 or the opposite end of the first pad part 600. That is, the second pad part 700 may be formed to make contact with the opposite end of the wiring electrode part 300 or the opposite end of the first pad part 600.

A protective layer 800 is formed by coating an insulation material on the space region. In detail, the protective layer 800 may be formed while making direct contact with the wiring electrode part or the first pad part or directly surrounding the wiring electrode part or the first pad part which is exposed to an outside through the space region.

As described above, according to the touch window of the embodiment, the protective layer including an insulation material is formed on the space region of the wiring electrode part or the pad part, that is, the exposed region.

Thus, the insulation layer is formed by coating an insulation material, which is capable of protecting the wiring electrode part or the pad part, on the space region of the wiring electrode part or the pad part, so that the insulation layer can perform the function of the protective layer of protecting the pad part.

Therefore, according to the touch window of the embodiment, the wiring electrode part or the pad part, which may be exposed to an outside through the space region, may be protected by the protective layer, so that the wiring electrode part or the pad part may be protected from oxidation or corrosion, so the reliability of the touch window may be improved.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A touch window comprising:
    a cover window including an active area and an unactive area;
    a sensing electrode part on the active area;
    a wiring electrode part formed on the unactive area and connected to the sensing electrode part;
    a pad part on one end of the wiring electrode part;
    an insulation film on one end of the pad part;
    a flexible printed circuit board spaced apart from the insulation film and formed on an opposite end of the pad part; and
    a protective layer on the pad part placed on a space region between the insulation film and the flexible printed circuit board;
    wherein the pad part includes a first pad portion in contact with and covered by the flexible printed circuit board, and a second pad portion separated from and exposed from the flexible printed circuit board; and
    wherein the protective layer is disposed on the second pad portion.

2. The touch window of claim 1, wherein the protective layer surrounds the pad part.

3. The touch window of claim 2, wherein the protective layer makes direct contact with the pad part.

4. The touch window of claim 1, wherein the protective layer comprises an insulation material.

5. The touch window of claim 4, wherein the insulation material comprises at least one of PET (polyethylene terephthalate), PC (polycarbonate), PES (polyethersulfone), PI (polyimide) and PMMA (polymethylmethacrylate).

6. The touch window of claim 1, wherein the sensing electrode part comprises:
    a first sensing electrode pattern and a second sensing electrode pattern on one surface of the cover window.

7. The touch window of claim 6, wherein the wiring electrode part and the pad part are formed on the unactive area of the cover window.

8. The touch window of claim 1, wherein the sensing electrode part comprises:
    a first sensing electrode pattern on one surface of the cover window; and
    a second sensing electrode pattern on one surface of a first substrate on the cover window.

9. The touch window of claim 8, wherein the wiring electrode part and the pad part are formed on the unactive areas of the cover window and the first substrate.

10. The touch window of claim 1, wherein the sensing electrode part comprises:
    a first sensing electrode pattern on one surface of a first substrate on the cover window; and
    a second sensing electrode pattern on one surface of a second substrate on the first substrate.

11. The touch window of claim 10, wherein the wiring electrode part and the pad part are formed on the first and second substrates.

12. The touch window of claim 1, wherein the sensing electrode part comprises:
    a first sensing electrode pattern on one surface of a substrate on the cover window; and
    a second sensing electrode pattern on an opposite surface of the substrate.

13. The touch window of claim 12, wherein the wiring electrode part and the pad part are formed on both surfaces of the substrate.

14. A touch window comprising:
    a cover window including an active area and an unactive area;
    a sensing electrode part on the active area;
    a wiring electrode part formed on the unactive area and connected to the sensing electrode part;
    an insulation film on one end of the wiring electrode part;
    a flexible printed circuit board spaced apart from the insulation film and formed on an opposite end of the wiring electrode part;
    a protective layer placed on a space region between the insulation film and the flexible printed circuit board; and
    a pad portion on the wiring electrode part and in contact with and covered by the flexible printed circuit hoard;
    wherein the wiring electrode part is separated from and exposed from the flexible printed circuit board, and
    wherein the protective layer is disposed on the wiring electrode part.

15. The touch window of claim 14, wherein the protective layer surrounds the wiring electrode part.

16. The touch window of claim 15, wherein the protective layer makes direct contact with the wiring electrode part.

17. The touch window of claim 14, wherein the protective layer comprises an insulation material.

18. The touch window of claim 17, wherein the insulation material comprises at least one of PET (polyethylene terephthalate), PC (polycarbonate), PES (polyethersulfone), PI (polyimide) and PMMA (polymethylmethacrylate).

* * * * *